(12) United States Patent
Yang et al.

(10) Patent No.: US 10,990,783 B2
(45) Date of Patent: Apr. 27, 2021

(54) METHOD FOR FINGERPRINT COLLECTION AND RELATED PRODUCTS

(71) Applicant: GUANGDONG OPPO MOBILE TELECOMMUNICATIONS CORP., LTD., Guangdong (CN)

(72) Inventors: Le Yang, Guangdong (CN); Haiping Zhang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 16/676,953

(22) Filed: Nov. 7, 2019

(65) Prior Publication Data

US 2020/0074142 A1 Mar. 5, 2020

Related U.S. Application Data

(63) Continuation of application No. PCT/CN2018/084706, filed on Apr. 26, 2018.

(30) Foreign Application Priority Data

May 12, 2017 (CN) .......................... 201710342841.4

(51) Int. Cl.
*G06K 9/00* (2006.01)
*G06F 3/01* (2006.01)

(52) U.S. Cl.
CPC ......... *G06K 9/00013* (2013.01); *G06F 3/017* (2013.01); *G06K 9/00087* (2013.01)

(58) Field of Classification Search
None
See application file for complete search history.

(56) References Cited

U.S. PATENT DOCUMENTS

| | | |
|---|---|---|
| 2010/0180136 A1 | 7/2010 | Thompson et al. |
| 2011/0294517 A1 | 12/2011 | Hahm et al. |
| 2012/0275669 A1 | 11/2012 | Kim |
| 2015/0109214 A1 | 4/2015 | Shi et al. |
| 2016/0034741 A1 | 2/2016 | Lan et al. |
| 2016/0092717 A1 | 3/2016 | Ling |
| 2016/0110025 A1 | 4/2016 | Hossu |
| 2016/0292488 A1 | 10/2016 | Ran et al. |

(Continued)

FOREIGN PATENT DOCUMENTS

| | | |
|---|---|---|
| CN | 1292539 | 4/2001 |
| CN | 1949248 | 4/2007 |

(Continued)

OTHER PUBLICATIONS

WIPO, ISR for PCT/CN2018/084706, dated Jun. 26, 2018.
EPO, Office Action for EP Application No. 18798336.6, dated Mar. 12, 2020.

*Primary Examiner* — Nicholas J Lee
(74) *Attorney, Agent, or Firm* — Hodgson Russ LLP (57) ABSTRACT

Provided are a terminal device and related products. A method includes the following. Pixels contained in an ordinary pixel set and a standby pixel set in a preset area are controlled to emit light when a finger of a user is applied to the preset area, where the light emitted by the pixels is configured to illuminate a fingerprint of the user. Perform fingerprint collection on the fingerprint illuminated by the light emitted by the pixels of the user.

20 Claims, 5 Drawing Sheets

(56) References Cited

U.S. PATENT DOCUMENTS

2017/0046558 A1\* 2/2017 Li ..................... G06K 9/0002
2017/0091506 A1   3/2017 Sinha et al.
2019/0286870 A1   9/2019 Ling et al.

FOREIGN PATENT DOCUMENTS

| CN | 101034332 | 9/2007 |
| CN | 101056578 | 10/2007 |
| CN | 101971191 | 2/2011 |
| CN | 103699691 | 4/2014 |
| CN | 104318205 | 1/2015 |
| CN | 204965276 | 1/2016 |
| CN | 105788528 | 7/2016 |
| CN | 105912168 | 8/2016 |
| CN | 105912918 | 8/2016 |
| CN | 106295611 | 1/2017 |
| EP | 3130986   | 2/2017 |

\* cited by examiner

METHOD FOR FINGERPRINT COLLECTION AND RELATED PRODUCTS

CROSS-REFERENCE TO RELATED APPLICATIONS

This application is a continuation of International Application No. PCT/CN2018/084706, filed on Apr. 26, 2018, which claims priority to Chinese Patent Application No. 201710342841.4, filed on May 12, 2017, the entire disclosures of which are incorporated herein by reference.

TECHNICAL FIELD

The present disclosure relates to the technical field of electronics, and particularly to a method for fingerprint collection and related products.

BACKGROUND

Nowadays, the fingerprint function has become the standard for smart phones. It can be seen that mobile phones without fingerprint function cannot keep up with the times. Fingerprint sensors are key devices for automatic fingerprint collection. In terms of the sensing principle, the fingerprint sensors can include an optical fingerprint sensor, a semiconductor capacitor sensor, an ultrasonic sensor, and the like.

The optical fingerprint sensor utilizes the principle of refraction and reflection of light. Light emitted by a light source has different angles of refraction and reflected light of different brightness on uneven lines of a fingerprint of a finger. The complementary metal-oxide-semiconductor transistor (CMOS) or charge coupled device (CCD) optics collects image information in different brightness to complete the fingerprint collection.

Fingerprint recognition plays a vital role in functions such as fingerprint unlocking and fingerprint payment. However, quality of the fingerprint collected by the fingerprint sensor determines a success rate of fingerprint recognition. Therefore, how to improve the quality of the fingerprint collected is a technical problem to be solved.

SUMMARY

According to a first aspect, implementations of the disclosure provide a terminal device. The terminal device includes an application processor (AP), an optical fingerprint sensor, and a touch display screen. The touch display screen has a preset area. The preset area includes an ordinary pixel set and a standby pixel set. The optical fingerprint sensor is disposed under the preset area.

The AP is configured to control pixels contained in the ordinary pixel set and the standby pixel set in the preset area to emit light when a finger of a user is applied to the preset area, where the light emitted by the pixels is configured to illuminate a fingerprint of the user. The optical fingerprint sensor is configured to perform fingerprint collection on the fingerprint of the user illuminated by the light emitted by the pixels.

According to a second aspect, implementations of the disclosure provide a method for fingerprint collection. The method is applicable to a terminal device. The terminal device includes an AP, an optical fingerprint sensor, and a touch display screen. The touch display screen has a preset area. The preset area includes an ordinary pixel set and a standby pixel set. The optical fingerprint sensor is disposed under the preset area. The method includes the following.

Control pixels contained in the ordinary pixel set and the standby pixel set in the preset area to emit light when a finger of a user is applied to the preset area, where the light emitted by the pixels is configured to illuminate a fingerprint of the user. Perform fingerprint collection on the fingerprint of the user illuminated by the light emitted by the pixels.

According to a third aspect, implementations of the disclosure provide a non-transitory computer readable storage medium. The non-transitory computer readable storage medium is configured to store a computer program which, when executed by a processor, causes the processor to execute the method of the second aspect.

BRIEF DESCRIPTION OF THE DRAWINGS

To describe technical solutions in implementations of the present disclosure or in the related art more clearly, the following briefly introduces the accompanying drawings required for describing the implementations or the related art.

DETAILED DESCRIPTION

In order for those skilled in the art to better understand technical solutions of the present disclosure, in the following, technical solutions of implementations of the present disclosure will be described clearly and completely with reference to accompanying drawings in implementations of the present disclosure. Apparently, implementations described hereinafter are merely some implementations, rather than all implementations, of the present disclosure. All other implementations obtained by those of ordinary skill in the art based on implementations of the present disclosure without creative efforts shall fall within the protection scope of the present disclosure.

Hereinafter, implementations of the disclosure will be described in detail.

The terms "first", "second", "third", "fourth", and the like used in the specification, the claims, and the accompany drawings of the present disclosure are used to distinguish different objects rather than describe a particular order. In addition, the terms "include", "comprise", and "have" as well as variations thereof are intended to cover non-exclusive inclusion. For example, a process, method, system, product, or apparatus including a series of steps or units is not limited to the listed steps or units. Instead, it can optionally include other steps or units that are not listed; alternatively, other steps or units inherent to the process, method, product, or apparatus can also be included.

The term "implementation" referred to herein means that a particular feature, structure, or character described in conjunction with the implementation may be contained in at least one implementation of the present disclosure. The phrase appearing in various places in the specification does not necessarily refer to the same implementation, nor does it refer to an independent or alternative implementation that is mutually exclusive with other implementations. It is explicitly and implicitly understood by those skilled in the art that an implementation described herein may be combined with other implementations.

A terminal device, also called a user equipment (UE), is a device that provides voice and/or data connectivity to a user, for example, a handheld device, an in-vehicle device, or the like that has a wireless connection function. Terminals generally include, for example, mobile phones, tablets, notebook computers, PDAs, mobile internet devices (MIDs), wearable devices such as smart watches, smart bracelets, pedometers, and the like.

The following describes implementations of the disclosure with reference to the accompanying drawings.

Figure 1:
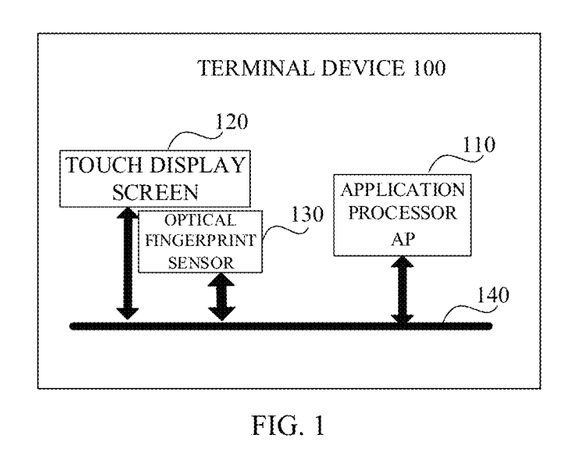
FIG. 1 is a schematic structural diagram illustrating a terminal device according to an implementation of the present disclosure.

FIG. 1 is a schematic structural diagram illustrating a terminal device 100 according to an implementation of the present disclosure. The terminal device 100 includes an application processor (AP) 110, an optical fingerprint sensor 130, and a touch display screen 120. The touch display screen 120 has a preset area. The preset area includes an ordinary pixel set and a standby pixel set. The optical fingerprint sensor is disposed under the preset area. The AP 110 is coupled with the touch display screen 120 and the optical fingerprint sensor 130 via a bus 140.

The AP 110 is configured to control pixels contained in the ordinary pixel set and the standby pixel set in the preset area to emit light when a finger of a user is applied to the preset area, where the light emitted by the pixels reaches a fingerprint of the user.

The optical fingerprint sensor 130 is configured to perform fingerprint collection on the fingerprint of the user the light emitted by the pixels reaches, so as to obtain a fingerprint image.

Pixels contained in the standby pixel set are used when the touch display screen is in a special state (such as the requirement for fingerprint collection, etc.), pixels contained in the ordinary pixel set are used when the touch display screen is in the special state or a general state (such as when the user views videos, reads news, etc.).

In an example, the touch display screen 120 is one of a liquid crystal display (LCD), an organic light-emitting diode (OLED) display, and a light-emitting diode (LED) display.

In an example, when a fingerprint collection instruction is detected, the AP 110 controls the pixels contained in the ordinary pixel set and the standby pixel set in the preset area to emit light. The fingerprint collection instruction is sent by the touch display screen 120 to the AP 110 when the touch display screen 120 detects a touch operation of the user on the touch display screen 120. In another example, the fingerprint collection instruction is sent by a fingerprint payment application to the AP 110 when the fingerprint payment application detects a fingerprint payment action. The disclosure is not limited.

In an example, the size of the preset area is at most a size of the entire touch display screen, and is at least a size that allows the user to enroll a sufficient size of a fingerprint, and the like, which is not limited herein.

In an example, the preset area may be in the lower left corner, the lower right corner, or the upper right corner of the touch screen display, etc., which is not limited herein.

In an example, the preset area may have a shape of circular, square, elliptical, diamond, or the like, which is not limited herein.

In an example, one or more preset areas can be configured, which is not limited herein.

In an example, all pixels contained in the standby pixel set are monochromatic (in other words, single-colored) pixels, where the monochromatic pixel is a green pixel, a red pixel, or a blue pixel.

In an example, all pixels contained in the standby pixel set are monochromatic pixels, where the monochromatic pixel is a green pixel.

Generally, pixels have three colors: red, green, and blue, among which the green pixel has the longest life, and green is a color least contained in the color of the skin. Light emitted by the green pixel is brighter than light emitted by the red pixel and the blue pixel, and it is more advantageous to increase brightness of the fingerprint in fingerprint acquisition, thereby improving the quality of the fingerprint acquired.

In an example, a number of the pixels contained in the ordinary pixel set is greater than a number of the pixels contained in the standby pixel set.

In an example, the pixels contained in the standby pixel set are separated by the pixels contained in the ordinary pixel set.

Figure 2A:
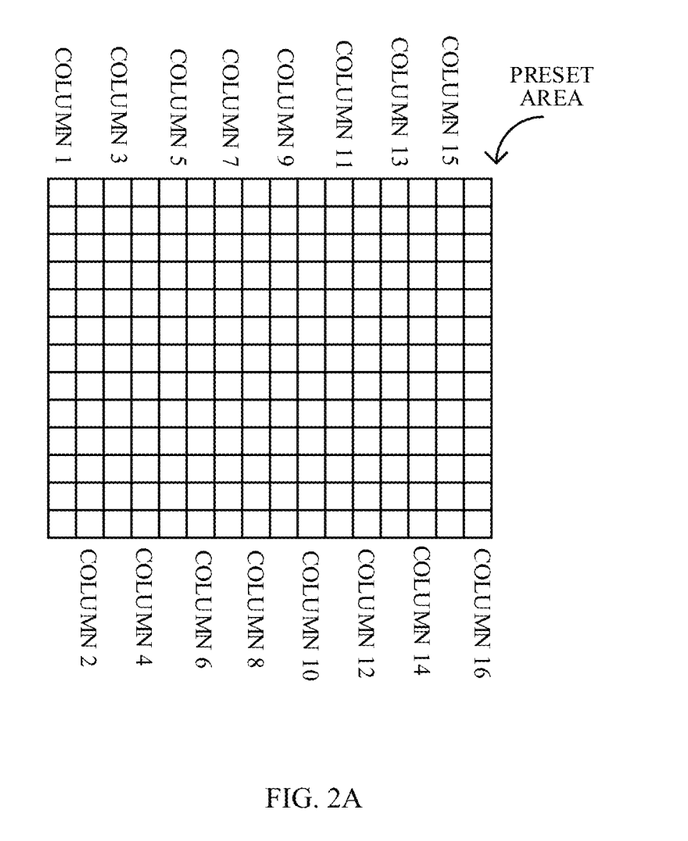
FIG. 2A is a schematic diagram illustrating pixel distribution in a preset area according to an implementation of the present disclosure.
Figure 2B:
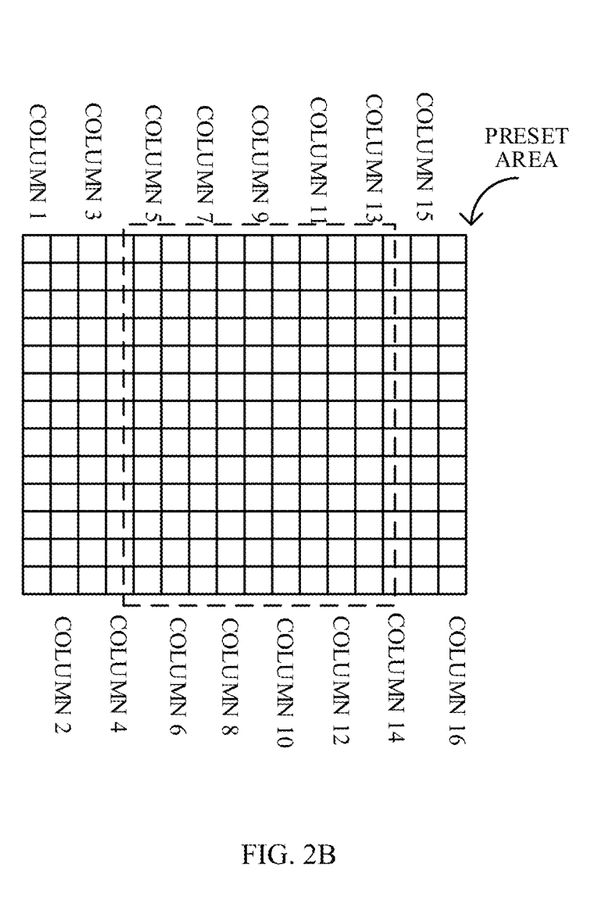
FIG. 2B is a schematic diagram illustrating pixel distribution in a preset area according to an implementation of the present disclosure.

For example, FIG. 2A is a schematic diagram illustrating pixel distribution in the preset area according to an implementation of the present disclosure. As illustrated in FIG. 2A, in one example, pixels in column 1, column 2, column 4, column 5, column 7, column 8, column 10, column 11, column 13, column 14, column 16 are pixels in the ordinary pixel set, and pixels in column 3, column 6, column 9, column 12, column 15 are pixels in the standby pixel set, and in this case, with the row as a reference, one standby pixel is set every two ordinary pixels in each row. In another example, pixels in column 1, column 2, column 3, column 5, column 6, column 7, column 9, column 10, column 11, column 13, column 14, column 15 are pixels in the ordinary pixel set, and pixels in column 4, column 8, column 12, and column 16 are pixels in the standby pixel set, and in this case, with the row as a reference, one standby pixel is set every three ordinary pixels in each row. In still another example, pixels in column 1, column 2, column 3, column 4, column 6, column 8, column 10, column 12, column 14, column 15, column 16 are pixels in the ordinary pixel set, and pixels in column 5, column 7, column 9, column 11, and column 13 are pixels in the standby pixel set, and in this case, with the row as a reference, standby pixels are distributed in the middle area of the preset area with a dense spacing. For the "middle area" of the preset area, reference can be made to the area in the dotted line in FIG. 2B. In addition, in this example, the "middle area" is not for limiting the location of the standby pixels in the preset area, and for indicating that the standby pixels are of concentrated distribution rather than dispersive distribution.

In an example, the preset area includes N subareas. The N subareas correspond to N ordinary pixel subsets, the N subareas are in one-to-one correspondence with the N ordinary pixel subsets, and the ordinary pixel set includes the N ordinary pixel subsets. The N subareas correspond to N standby pixel subsets, the N subareas are in one-to-one correspondence with the N standby pixel subsets, and the standby pixel set includes the N standby pixel subsets. N is a positive integer.

Furthermore, the N subareas are the same in size or at least two subareas of the N subareas are different in size.

Furthermore, the N subareas are the same in shape or at least two subareas of the N subareas are different in shape.

It is to be noted that, all pixels contained in an ordinary pixel subset corresponding to a subarea i are pixels in the subarea i. All pixels contained in a standby pixel subset corresponding to the subarea i are pixels in the subarea i. The subarea i is one of the N subareas.

Furthermore, the AP 110 is configured to: control all pixels contained in the N ordinary pixel subsets to emit light, and control all pixels contained in M standby pixel subsets of the N standby pixel subsets to emit light, where M is less than N and is a positive integer.

Furthermore, the fingerprint of the user is horizontally projected to M subareas corresponding to the M standby pixel subsets.

Figure 3:
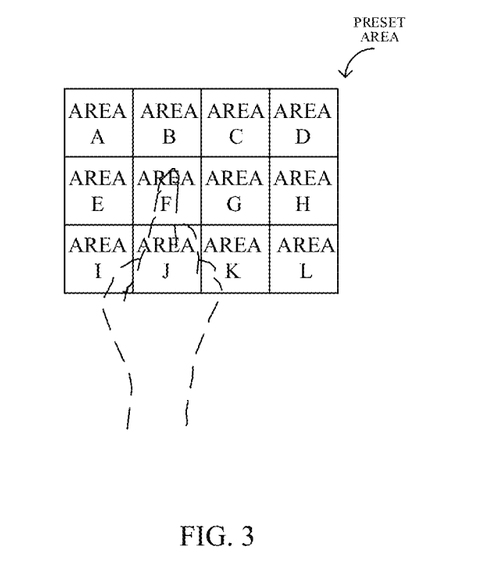
FIG. 3 is a schematic diagram illustrating an interface according to an implementation of the present disclosure.

For example, FIG. 3 is a schematic diagram illustrating an interface according to an implementation of the present disclosure. As illustrated in FIG. 3, the N subareas of the preset area are of the same size and shape, N=12, and for pixel distribution of the N subareas of the preset area, reference can be made to FIG. 2A. The N subareas are area A to area L. When it is detected that the fingerprint of the user is right above area F of the preset area, since a projection in horizontal direction of the fingerprint of the user only falls within the area F (corresponding to M subareas, M=1), in this case, only by controlling all the pixels contained in the N ordinary pixel subsets to emit light, and controlling all pixels contained in a standby pixel subset (corresponding to M standby pixel subsets) corresponding to the area F to emit light, the optical fingerprint sensor can obtain a clear fingerprint. Compared with controlling all pixels contained in the ordinary pixel set and the standby pixel set in the preset area, this solution controls, according to a location of the projection in horizontal direction of the fingerprint of the user, a part of pixels to emit light, and thus power consumption of the terminal device can be reduced under the premise of obtaining a clear fingerprint.

Furthermore, the fingerprint of the user is horizontally projected to W subareas corresponding to W standby pixel subsets, where W is less than M and is a positive integer. The M standby pixel subsets include the W standby pixel subsets. (M−W) subareas corresponding to (M−W) standby pixel subsets are adjacent to the W subareas. The (M−W) standby pixel subsets are standby pixel subsets of the M standby pixel subsets other than the W standby pixel subsets.

For example, FIG. 3 is a schematic diagram illustrating an interface according to an implementation of the present disclosure. As illustrated in FIG. 3, the N subareas of the preset area are of the same size and shape, N=12. The N subareas are area A to area L. When it is detected that the fingerprint of the user is right above area F of the preset area, since a projection in horizontal direction of the fingerprint of the user only falls within the area F (corresponding to W subareas, W=1) and areas adjacent to the area F are areas B, E, J, G (corresponding to (M−W) subareas, (M−W)=4), in this case, only by controlling all the pixels contained in the N ordinary pixel subsets to emit light, and controlling all pixels contained in standby pixel subsets (corresponding to M standby pixel subsets) corresponding to areas F and B, E, J, G (corresponding to M subareas, M=5) to emit light, the optical fingerprint sensor can obtain a clear fingerprint. Compared with controlling all pixels contained in the ordinary pixel set and the standby pixel set in the preset area, this solution controls, according to a location of the projection in horizontal direction of the fingerprint of the user, a part of pixels to emit light, and thus power consumption of the terminal device can be reduced under the premise of obtaining a clear fingerprint.

Furthermore, the AP 110 is configured to: control all pixels contained in M ordinary pixel subsets of the N ordinary pixel subsets to emit light, and control all pixels contained in M standby pixel subsets of the N standby pixel subsets to emit light, where the M ordinary pixel subsets are in one-to-one correspondence with the M standby pixel subsets and M is less than N and is a positive integer.

Furthermore, the fingerprint of the user is horizontally projected to M subareas corresponding to the M standby pixel subsets.

For example, FIG. 3 is a schematic diagram illustrating an interface according to an implementation of the present disclosure. As illustrated in FIG. 3, the N subareas of the preset area are of the same size and shape, N=12. The N subareas are area A to area L. When it is detected that the fingerprint of the user is right above area F of the preset area, since a projection in horizontal direction of the fingerprint of the user only falls within the area F (corresponding to M subareas, M=1), in this case, only by controlling all the pixels contained in an ordinary pixel subset (corresponding to M ordinary pixel subsets) corresponding to the area F to emit light, and controlling all pixels contained in a standby pixel subset (corresponding to M standby pixel subsets) corresponding to the area F to emit light, the optical fingerprint sensor can obtain a clear fingerprint. Compared with controlling all pixels contained in the ordinary pixel set and the standby pixel set in the preset area, this solution controls, according to a location of the projection in horizontal direction of the fingerprint of the user, a part of pixels to emit light, and thus power consumption of the terminal device can be reduced under the premise of obtaining a clear fingerprint.

Furthermore, the fingerprint of the user is horizontally projected to W subareas corresponding to W standby pixel subsets, where W is less than M and is a positive integer. The W standby pixel subsets are part of the M standby pixel subsets. (M−W) subareas corresponding to (M−W) standby pixel subsets are adjacent to the W subareas. The (M−W) standby pixel subsets are standby pixel subsets of the M standby pixel subsets other than the W standby pixel subsets.

For example, FIG. 3 is a schematic diagram illustrating an interface according to an implementation of the present disclosure. As illustrated in FIG. 3, the N subareas of the preset area are of the same size and shape, N=12. The N subareas are area A to area L. When it is detected that the fingerprint of the user is right above area F of the preset area, since a projection in horizontal direction of the fingerprint of the user only falls within the area F (corresponding to W subareas, W=1) and areas adjacent to the area F are areas B, E, J, G (corresponding to (M−W) subareas, (M−W)=4), in this case, only by controlling all the pixels contained in ordinary pixel subsets (corresponding to M ordinary pixel subsets) corresponding to areas F and B, E, J, G (corresponding to M subareas, M=5) to emit light and controlling all pixels contained in standby pixel subsets (corresponding to M standby pixel subsets) corresponding to the areas F and B, E, J, G to emit light, the optical fingerprint sensor can obtain a clear fingerprint. Compared with controlling all pixels contained in the ordinary pixel set and the standby pixel set in the preset area, this solution controls, according to a location of the projection in horizontal direction of the fingerprint of the user, a part of pixels to emit light, and thus power consumption of the terminal device can be reduced under the premise of obtaining a clear fingerprint.

According to the technical solutions of the disclosure, during fingerprint collection, the pixels contained in both the ordinary pixel set and the standby pixel set are controlled to emit light to increase the brightness, so as to improve quality of the fingerprint collected.

Figure 4:
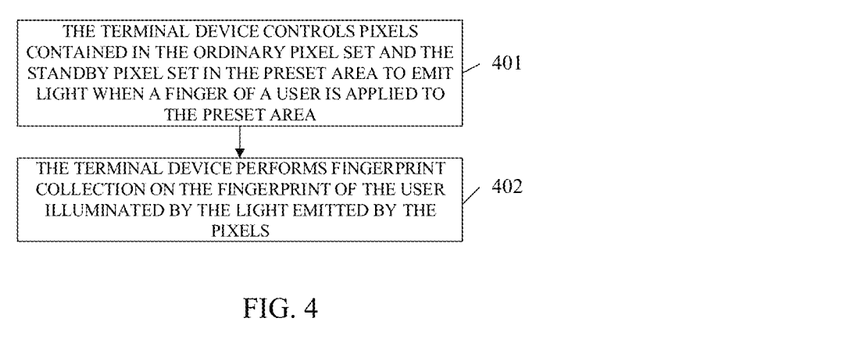
FIG. 4 is a schematic flow chart illustrating a method for fingerprint collection according to an implementation of the present disclosure.

FIG. 4 is a schematic flow chart illustrating a method for fingerprint collection according to an implementation of the present disclosure. The method is applicable to a terminal device. The terminal device includes an AP, an optical fingerprint sensor, and a touch display screen. The touch display screen has a preset area. The preset area includes an ordinary pixel set and a standby pixel set. The optical fingerprint sensor is disposed under the preset area. The method begins at block 401.

At block 401, the terminal device controls pixels contained in the ordinary pixel set and the standby pixel set in the preset area to emit light when a finger of a user is applied to the preset area. The light emitted by the pixels is configured to illuminate a fingerprint of the user.

Pixels contained in the standby pixel set are used when the touch display screen is in a special state (such as the requirement for fingerprint collection, etc.), pixels contained in the ordinary pixel set are used when the touch display screen is in the special state or a general state (such as when the user views videos, reads news, etc.).

In an example, the touch display screen 120 is one of a liquid crystal display (LCD), an organic light-emitting diode (OLED) display, and a light-emitting diode (LED) display.

In an example, when a fingerprint collection instruction is detected, the AP 110 controls the pixels contained in the ordinary pixel set and the standby pixel set in the preset area to emit light. The fingerprint collection instruction is sent by the touch display screen 120 to the AP 110 when the touch display screen 120 detects a touch operation of the user on the touch display screen 120. In another example, the fingerprint collection instruction is sent by a fingerprint payment application to the AP 110 when the fingerprint payment application detects a fingerprint payment action. The disclosure is not limited.

In an example, the size of the preset area is at most a size of the entire touch display screen, and is at least a size that allows the user to enroll a sufficient size of a fingerprint, and the like, which is not limited herein.

In an example, the preset area may be in the lower left corner, the lower right corner, or the upper right corner of the touch screen display, etc., which is not limited herein.

In an example, the preset area may have a shape of circular, square, elliptical, diamond, or the like, which is not limited herein.

In an example, one or more preset areas can be configured, which is not limited herein.

In an example, all pixels contained in the standby pixel set are monochromatic pixels, where the monochromatic pixel is a green pixel, a red pixel, or a blue pixel.

In an example, all pixels contained in the standby pixel set are monochromatic pixels, where the monochromatic pixel is a green pixel.

Generally, pixels have three colors: red, green, and blue, among which the green pixel has the longest life, and green is a color least contained in the color of the skin. Light emitted by the green pixel is brighter than light emitted by the red pixel and the blue pixel, and it is more advantageous to increase brightness of the fingerprint in fingerprint acquisition, thereby improving the quality of the fingerprint acquired.

In an example, a number of the pixels contained in the ordinary pixel set is greater than a number of the pixels contained in the standby pixel set.

In an example, the pixels contained in the standby pixel set are separated by the pixels contained in the ordinary pixel set.

For example, FIG. 2A is a schematic diagram illustrating pixel distribution in the preset area according to an implementation of the present disclosure. As illustrated in FIG. 2A, in one example, pixels in column 1, column 2, column 4, column 5, column 7, column 8, column 10, column 11, column 13, column 14, column 16 are pixels in the ordinary pixel set, and pixels in column 3, column 6, column 9, column 12, column 15 are pixels in the standby pixel set, and in this case, with the row as a reference, one standby pixel is set every two ordinary pixels in each row. In another example, pixels in column 1, column 2, column 3, column 5, column 6, column 7, column 9, column 10, column 11, column 13, column 14, column 15 are pixels in the ordinary pixel set, and pixels in column 4, column 8, column 12, and column 16 are pixels in the standby pixel set, and in this case, with the row as a reference, one standby pixel is set every three ordinary pixels in each row. In still another example, pixels in column 1, column 2, column 3, column 4, column 6, column 8, column 10, column 12, column 14, column 15, column 16 are pixels in the ordinary pixel set, and pixels in column 5, column 7, column 9, column 11, and column 13 are pixels in the standby pixel set, and in this case with the row as a reference, standby pixels are distributed in the middle area of the preset area with a dense spacing.

In an example, the preset area includes N subareas. The N subareas correspond to N ordinary pixel subsets, the N subareas are in one-to-one correspondence with the N ordinary pixel subsets, and the ordinary pixel set includes the N ordinary pixel subsets. The N subareas correspond to N standby pixel subsets, the N subareas are in one-to-one correspondence with the N standby pixel subsets, and the standby pixel set includes the N standby pixel subsets. N is a positive integer.

Furthermore, the N subareas are the same in size or at least two subareas of the N subareas are different in size.

Furthermore, the N subareas are the same in shape or at least two subareas of the N subareas are different in shape.

It is to be noted that, all pixels contained in an ordinary pixel subset corresponding to a subarea i are pixels in the subarea i. All pixels contained in a standby pixel subset corresponding to the subarea i are pixels in the subarea i. The subarea i is one of the N subareas.

Furthermore, the terminal device controls the pixels contained in the ordinary pixel set and the standby pixel set in the preset area to emit the light as follows. The terminal device controls all pixels contained in the N ordinary pixel subsets to emit light, and controls all pixels contained in M standby pixel subsets of the N standby pixel subsets to emit light, where M is less than N and is a positive integer.

Furthermore, the fingerprint of the user is horizontally projected to M subareas corresponding to the M standby pixel subsets.

For example, FIG. 3 is a schematic diagram illustrating an interface according to an implementation of the present disclosure. As illustrated in FIG. 3, the N subareas of the preset area are of the same size and shape. The N subareas are area A to area L. When it is detected that the fingerprint of the user is right above area F of the preset area, since a projection in horizontal direction of the fingerprint of the user only falls within the area F, in this case, only by controlling all the pixels contained in the N ordinary pixel subsets to emit light, and controlling all pixels contained in a standby pixel subset corresponding to the area F to emit light, the optical fingerprint sensor can obtain a clear fingerprint. Compared with controlling all pixels contained in the ordinary pixel set and the standby pixel set in the preset area, this solution controls, according to a location of the projection in horizontal direction of the fingerprint of the user, a part of pixels to emit light, and thus power consumption of the terminal device can be reduced under the premise of obtaining a clear fingerprint.

Furthermore, the fingerprint of the user is horizontally projected to W subareas corresponding to W standby pixel subsets, where W is less than M and is a positive integer. The M standby pixel subsets include the W standby pixel subsets. (M−W) subareas corresponding to (M−W) standby pixel subsets are adjacent to the W subareas. The (M−W) standby pixel subsets are standby pixel subsets of the M standby pixel subsets other than the W standby pixel subsets.

For example, FIG. 3 is a schematic diagram illustrating an interface according to an implementation of the present disclosure. As illustrated in FIG. 3, the N subareas of the preset area are of the same size and shape. The N subareas are area A to area L. When it is detected that the fingerprint of the user is right above area F of the preset area, since a projection in horizontal direction of the fingerprint of the user only falls within the area F and areas adjacent to the area F are area B, area E, area J, and area G, in this case, only by controlling all the pixels contained in the N ordinary pixel subsets to emit light, and controlling all pixels contained in standby pixel subsets corresponding to the area F, the area B, the area E, the area J, and the area G to emit light, the optical fingerprint sensor can obtain a clear fingerprint. Compared with controlling all pixels contained in the ordinary pixel set and the standby pixel set in the preset area, this solution controls, according to a location of the projection in horizontal direction of the fingerprint of the user, a part of pixels to emit light, and thus power consumption of the terminal device can be reduced under the premise of obtaining a clear fingerprint.

Furthermore, the terminal device controls the pixels contained in the ordinary pixel set and the standby pixel set in the preset area to emit the light as follows. The terminal device controls all pixels contained in M ordinary pixel subsets of the N ordinary pixel subsets to emit light, and controls all pixels contained in M standby pixel subsets of the N standby pixel subsets to emit light, where the M ordinary pixel subsets are in one-to-one correspondence with the M standby pixel subsets and M is less than N and is a positive integer.

Furthermore, the fingerprint of the user is horizontally projected to M subareas corresponding to the M standby pixel subsets.

For example, FIG. 3 is a schematic diagram illustrating an interface according to an implementation of the present disclosure. As illustrated in FIG. 3, the N subareas of the preset area are of the same size and shape. The N subareas are area A to area L. When it is detected that the fingerprint of the user is right above area F of the preset area, since a projection in horizontal direction of the fingerprint of the user only falls within the area F, in this case, only by controlling all the pixels contained in an ordinary pixel subset corresponding to the area F to emit light, and controlling all pixels contained in a standby pixel subset corresponding to the area F to emit light, the optical fingerprint sensor can obtain a clear fingerprint. Compared with controlling all pixels contained in the ordinary pixel set and the standby pixel set in the preset area, this solution controls, according to a location of the projection in horizontal direction of the fingerprint of the user, a part of pixels to emit light, and thus power consumption of the terminal device can be reduced under the premise of obtaining a clear fingerprint.

Furthermore, the fingerprint of the user is horizontally projected to W subareas corresponding to W standby pixel subsets, where W is less than M and is a positive integer. The M standby pixel subsets include the W standby pixel subsets. (M−W) subareas corresponding to (M−W) standby pixel subsets are adjacent to the W subareas. The (M−W) standby pixel subsets are standby pixel subsets of the M standby pixel subsets other than the W standby pixel subsets.

For example, FIG. 3 is a schematic diagram illustrating an interface according to an implementation of the present disclosure. As illustrated in FIG. 3, the N subareas of the preset area are of the same size and shape. The N subareas are area A to area L. When it is detected that the fingerprint of the user is right above area F of the preset area, since a projection in horizontal direction of the fingerprint of the user only falls within the area F and areas adjacent to the area F are area B, area E, area J, and area G, in this case, only by controlling all the pixels contained in ordinary pixel subsets corresponding to the area F, the area B, the area E, the area J, and the area G to emit light, and controlling all pixels contained in standby pixel subsets corresponding to the area F, the area B, the area E, the area J, and the area G to emit light, the optical fingerprint sensor can obtain a clear fingerprint. Compared with controlling all pixels contained in the ordinary pixel set and the standby pixel set in the preset area, this solution controls, according to a location of the projection in horizontal direction of the fingerprint of the user, a part of pixels to emit light, and thus power consumption of the terminal device can be reduced under the premise of obtaining a clear fingerprint.

At block 402, the terminal device performs fingerprint collection on the fingerprint of the user illuminated by the light emitted by the pixels.

According to the technical solutions of the disclosure, during fingerprint collection, the pixels contained in both the ordinary pixel set and the standby pixel set are controlled to emit light to increase the brightness, so as to improve quality of the fingerprint collected.

Figure 5:
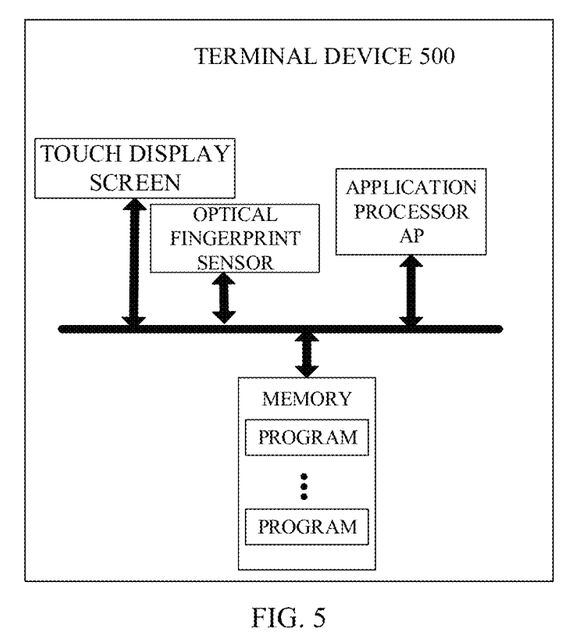
FIG. 5 is a schematic structural diagram illustrating a terminal device according to another implementation of the present disclosure.

FIG. 5 is a schematic structural diagram illustrating a terminal device 500 according to another implementation of the present disclosure. The terminal device 500 includes at least one processor including an AP, a touch display screen, an optical fingerprint sensor, and a memory. The touch display screen has a preset area, where the preset area includes an ordinary pixel set and a standby pixel set. The optical fingerprint sensor is disposed under the preset area. The memory is configured to store one or more programs.

The one or more programs are configured to be executed by the AP and include instructions configured to: control pixels contained in the ordinary pixel set and the standby pixel set in the preset area to emit light when a finger of a user is placed in the preset area, where the light emitted by the pixels is configured to illuminate a fingerprint of the user, and perform fingerprint collection on the fingerprint of the user illuminated by the light emitted by the pixels.

In an example, the preset area includes N subareas, and where the N subareas correspond to N ordinary pixel subsets and the ordinary pixel set includes the N ordinary pixel subsets, the N subareas correspond to N standby pixel subsets and the standby pixel set includes the N standby pixel subsets, and N is a positive integer.

In an example, the instructions configured to control the pixels contained in the ordinary pixel set and the standby pixel set in the preset area to emit the light is configured to: control all pixels contained in the N ordinary pixel subsets to emit light, and control all pixels contained in M standby pixel subsets of the N standby pixel subsets to emit light, where M is less than N and is a positive integer.

In an example, the instructions configured to control the pixels contained in the ordinary pixel set and the standby pixel set in the preset area to emit the light is configured to: control all pixels contained in M ordinary pixel subsets of the N ordinary pixel subsets to emit light, and control all pixels contained in M standby pixel subsets of the N standby pixel subsets to emit light, where the M ordinary pixel subsets are in one-to-one correspondence with the M standby pixel subsets and M is less than N and is a positive integer.

In an example, a projection of the fingerprint of the user in horizontal direction falls within M subareas corresponding to the M standby pixel subsets.

According to the technical solutions of the disclosure, during fingerprint collection, the pixels contained in both the ordinary pixel set and the standby pixel set are controlled to emit light to increase the brightness, so as to improve quality of the fingerprint collected.

Figure 6:
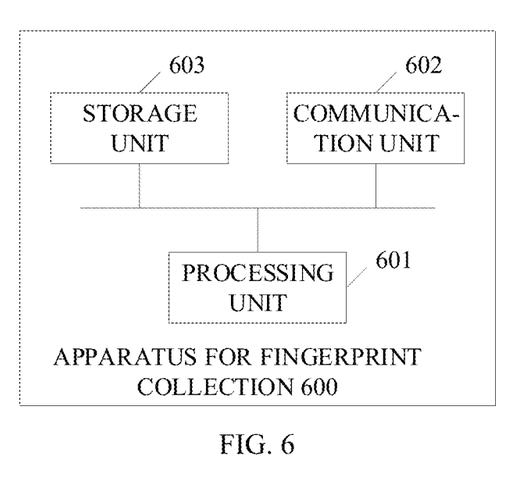
FIG. 6 is a schematic structural diagram illustrating an apparatus for fingerprint collection according to an implementation of the present disclosure.

FIG. 6 is a schematic structural diagram illustrating an apparatus for fingerprint collection 600 according to another implementation of the present disclosure. The apparatus 600 is applicable to a terminal device. The terminal device includes an AP, an optical fingerprint sensor, and a touch display screen. The touch display screen has a preset area. The preset area includes an ordinary pixel set and a standby pixel set. The optical fingerprint sensor is disposed under the preset area. The apparatus 600 includes a processing unit 601, a communication unit 602, and a storage unit 603.

The processing unit 601 is configured to: control pixels contained in the ordinary pixel set and the standby pixel set in the preset area to emit light when a finger of a user is in contact with the preset area, where the light emitted by the pixels is configured to irradiate a fingerprint of the user, and perform fingerprint collection on the fingerprint of the user irradiated by the light emitted by the pixels.

The processing unit 601 may be, a processor or a controller (for example, a central processing unit (CPU)), a general-purpose processor, a digital signal processor (DSP), an application-specific integrated circuit (ASIC), a field programmable gate array (FPGA), or other programmable logic devices, transistor logic devices, hardware components, or any combination thereof. Various exemplary logical blocks, modules, and circuits described in conjunction with the disclosure may be achieved or implemented. The processor may also be a combination of computing functions, for example, a combination of one or more microprocessors, a combination of the DSP and the microprocessor, and the like. The communication unit 602 may be a transceiver, a transceiver circuit, a radio frequency chip, a communication interface, or the like. The storage unit 603 may be a memory.

When the processing unit 601 is the processor, the communication unit 602 is the communication interface, and the storage unit 603 is the memory, the apparatus for fingerprint collection provided herein can be a terminal device illustrated in FIG. 5.

Figure 7:
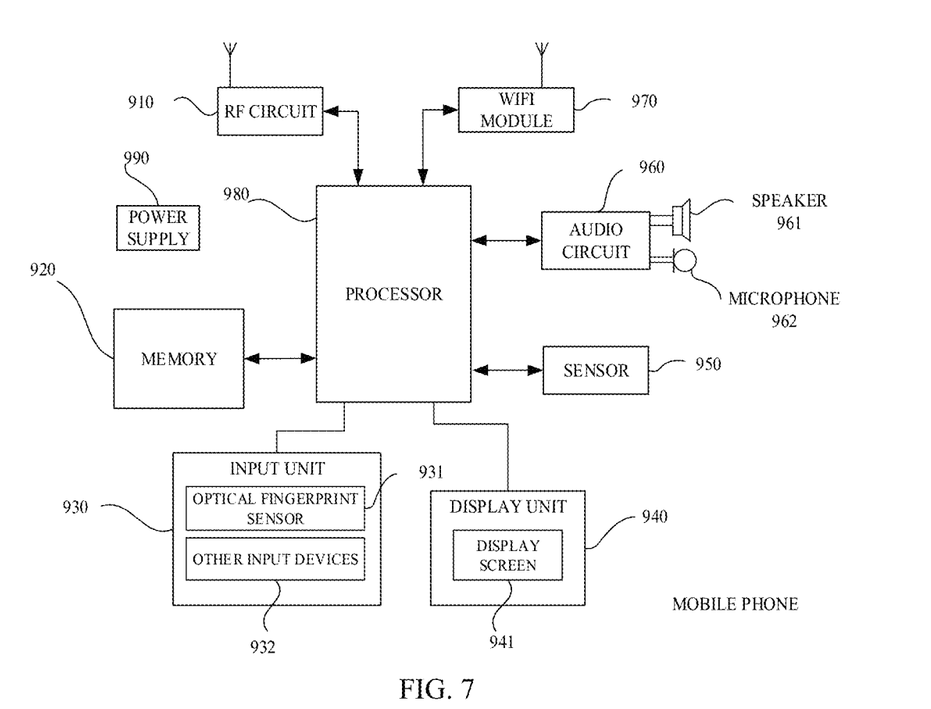
FIG. 7 is a schematic structural diagram illustrating a terminal device according to another implementation of the present disclosure.

Implementations of the disclosure also provide another terminal device. As illustrated in FIG. 7, only parts related to the implementations of the present disclosure are illustrated for ease of description. For technical details not described, reference may be made to the method implementations of the present disclosure. The terminal device may be any device, such as a mobile phone, a tablet computer, a personal digital assistant (PDA), a point of sale terminal (POS), an on-board computer and the like. The following describes the mobile phone as an example of the terminal device.

FIG. 7 is a structural diagram illustrating parts of a mobile phone related to the terminal device according to another implementation of the present disclosure. As illustrated in FIG. 7, the mobile phone includes a radio frequency (RF) circuit 910, a memory 920, an input unit 930, a display unit 940, a sensor 950, an audio circuit 960, a wireless fidelity (Wi-Fi) module 970, a processor 980, a power supply 990 and other components. Those skilled in the art can understand that the structure of the mobile phone illustrated in FIG. 7 does not constitute any limitation on a mobile phone. The mobile phone configured to implement technical solutions of the disclosure may include more or fewer components than illustrated or may combine certain components or different components.

In the following, various components of the mobile phone will be described in detail with reference to FIG. 7.

The RF circuit 910 is configured to transmit or receive information. Generally, the RF circuit 910 includes but is not limited to an antenna, at least one amplifier, a transceiver, a coupler, a low noise amplifier (LNA), a duplexer, and the like. In addition, the RF circuit 910 may also communicate with the network and other devices via wireless communication. The above wireless communication may use any communication standard or protocol, which includes but is not limited to global system of mobile communication (GSM), general packet radio service (GPRS), code division multiple access (CDMA), wideband code division multiple access (WCDMA), long term evolution (LTE), E-mail, short messaging service (SMS), and so on.

The memory 920 is configured to store software programs and modules, and the processor 980 is configured to execute various function applications and data processing of the mobile phone by running the software programs and the modules stored in the memory 920. The memory 920 mainly includes a program storage area and a data storage area. The program storage area may store an operating system, application programs required for at least one function, and so on. The data storage area may store data (such as a fingerprint(s) of a user collected by an optical fingerprint sensor) created according to use of the mobile phone, and so on. In addition, the memory 920 may include a high-speed RAM, and may further include a non-volatile memory such as at least one disk storage device, a flash memory device, or other non-volatile solid-state storage devices.

The input unit 930 may be configured to receive input digital or character information and generate key signal input associated with user setting and function control of the mobile phone. The input unit 930 may include an optical fingerprint sensor 931 and other input devices 932. The optical fingerprint sensor 931 can perform fingerprint collection on the fingerprint of the user. In addition to the optical fingerprint sensor 931, the input unit 930 may further include other input devices 932. The other input devices 932 may include, but are not limit to, one or more of a touch screen, a physical key, a function key (such as a volume control key, a switch key, etc.), a trackball, a mouse, a joystick, and the like.

The display unit 940 is configured to display information input by the user or information provided for the user or various menus of the mobile phone. The display unit 940 may include a display screen 941. The display screen 941 may be in the form of a liquid crystal display (LCD), an organic light-emitting diode (OLED), and so on. Although the optical fingerprint sensor 931 and the display screen 941 are illustrated as two separate components in FIG. 7 to realize the input and output functions of the mobile phone, in other examples, the optical fingerprint sensor 931 may be integrated with the display screen 941 to implement the input and output functions of the mobile phone.

The mobile phone may also include at least one sensor 950, such as a light sensor, a motion sensor, and other sensors. The light sensor may include an ambient light sensor and a proximity sensor, among which the ambient light sensor may adjust the brightness of the display screen 941 according to ambient lights, and the proximity sensor may turn off the display screen 941 and/or backlight when the mobile phone reaches nearby the ear. As a kind of motion sensor, an accelerometer sensor can detect the magnitude of acceleration in all directions (typically three axes) and when the mobile phone is stationary, the accelerometer sensor can detect the magnitude and direction of gravity; the accelerometer sensor can also identify gestures of the mobile phone (such as vertical and horizontal screen switch, related games, magnetometer attitude calibration), or the accelerometer sensor can be used for vibration-recognition related functions (such as a pedometer, percussion) and so on. The mobile phone can also be equipped with a gyroscope, a barometer, a hygrometer, a thermometer, and an infrared sensor and other sensors, and it will not be repeated herein.

The audio circuit 960, a speaker 961, a microphone 962 may provide an audio interface between the user and the mobile phone. The audio circuit 960 may convert the received audio data into electrical signals and transfer the electrical signals to the speaker 961; thereafter the speaker 961 converts the electrical signals into sound signals for output. On the other hand, the microphone 962 converts the received sound signals into electrical signals, which will be received and converted into audio data by the audio circuit 960 for output. The audio data is then processed and transmitted by the processor 980 via the RF circuit 910 to another mobile phone for example, or the audio data is output to the memory 920 for further processing.

Wi-Fi belongs to a short-range wireless transmission technology. With aid of the Wi-Fi module 970, the mobile phone may assist the user in E-mail receiving and sending, webpage browsing, access to streaming media, and the like. Wi-Fi provides users with wireless broadband Internet access. Although the Wi-Fi module 970 is illustrated in FIG. 7, it can be understood that, the Wi-Fi module 970 is not essential to the mobile phone and can be omitted according to actual needs without departing from the essential nature of the present disclosure.

The processor 980 is the control center of the mobile phone and is configured to connect various parts of the whole mobile phone through various interfaces and lines, run or execute software programs and/or modules stored in the memory 920, and invoke data stored in the memory 920 to perform various functions of the mobile phone and process data, thereby monitoring the mobile phone as a whole. The processor 980 may include one or more processing units. For example, the processor 980 may integrate an application processor and a modem processor, where the application processor is configured to handle the operating system, the user interface, the application, and so on, and the modem processor is mainly configured to process wireless communication. It will be understood that the above-mentioned modem processor may not be integrated into the processor 980.

The mobile phone also includes a power supply 990 (e.g., a battery) that supplies power to various components. For instance, the power supply 990 may be logically connected to the processor 980 via a power management system to enable management of charging, discharging, and power consumption through the power management system.

Although not illustrated, the mobile phone may include a camera, a Bluetooth module, etc., and the disclosure will not elaborate herein.

The method of the foregoing implementations illustrated in FIG. 4 can be realized based on the structure of the mobile phone.

The functions of the units illustrated in FIG. 6 can be achieved based on the structure of the mobile phone.

Implementations of the present disclosure further provides a non-transitory computer readable storage medium. The computer storage medium may store computer programs for electronic data interchange, and the computer programs are operable with a computer to execute all or part of operations of any of the methods for fingerprint collection recited in the method implementations mentioned above.

Implementations of the present disclosure further provide a computer program product. The computer program product includes a non-transitory computer readable storage medium that stores computer programs. The computer programs are operable with a computer to perform all or part of operations of any of the methods for fingerprint collection recited in the method implementations mentioned above. The computer program product may be a software installation package.

It is to be noted that, for the sake of simplicity, the foregoing method implementations are described as a series of action combinations, however, it will be appreciated by those skilled in the art that the present disclosure is not limited by the sequence of actions described. According to the present disclosure, certain steps or operations may be performed in other order or simultaneously. Besides, it will be appreciated by those skilled in the art that the implementations described in the specification are exemplary implementations and the actions and modules involved are not necessarily essential to the present disclosure.

In the foregoing implementations, the description of each implementation has its own emphasis. For the parts not described in detail in one implementation, reference may be made to related descriptions in other implementations.

In the implementations of the disclosure, it is to be understood that, the apparatus disclosed in implementations provided herein may be implemented in other manners. For example, the device/apparatus implementations described above are merely illustrative; for instance, the division of the unit is only a logical function division and there can be other manners of division during actual implementations, for example, multiple units or components may be combined or may be integrated into another system, or some features may be ignored or skipped. In addition, coupling or communication connection between each illustrated or discussed component may be direct coupling or communication connection, or may be indirect coupling or communication among devices or units via some interfaces, and may be electrical connection or other forms of connection.

The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations of the present disclosure may be integrated into one processing unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device, and so on) to perform all or part of the steps described in the various implementations of the present disclosure. The memory includes various medium capable of storing program codes, such as a universal serial bus (USB) flash disk, a read-only memory (ROM), a random-access memory (RAM), a removable hard disk, Disk, compact disc (CD), or the like.

It will be understood by those of ordinary skill in the art that all or part of the operations of the various methods of the implementations described above may be accomplished by means of a program to instruct associated hardware, the program may be stored in a computer-readable memory, which may include a flash memory, a ROM, a RAM, Disk or CD, and so on.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A terminal device, comprising
    a touch display screen, having a preset area, the preset area comprising an ordinary pixel set and a standby pixel set, wherein pixels contained in the standby pixel set are used for fingerprint collection, and pixels contained in the ordinary pixel set are used for both fingerprint collection and display;
    an application processor (AP), configured to control pixels contained in the ordinary pixel set and the standby pixel set in the preset area to emit light when a finger of a user is applied to the preset area, the light emitted by the pixels being configured to illuminate a fingerprint of the user; and
    an optical fingerprint sensor, disposed under the preset area and configured to perform fingerprint collection on the fingerprint of the user illuminated by the light emitted by the pixels.
2. The terminal device of claim 1, wherein the preset area comprises N subareas, and wherein the N subareas correspond to N ordinary pixel subsets and the ordinary pixel set comprises the N ordinary pixel subsets, the N subareas correspond to N standby pixel subsets and the standby pixel set comprises the N standby pixel subsets, and N is a positive integer.
3. The terminal device of claim 2, wherein the AP is configured to:
    control all pixels contained in the N ordinary pixel subsets to emit light; and
    control all pixels contained in M standby pixel subsets of the N standby pixel subsets to emit light, wherein M is less than N and is a positive integer.
4. The terminal device of claim 3, wherein the fingerprint of the user is horizontally projected to M subareas corresponding to the M standby pixel subsets.
5. The terminal device of claim 3, wherein
    the fingerprint of the user is horizontally projected to W subareas corresponding to W standby pixel subsets, wherein W is less than M and is a positive integer;
    the M standby pixel subsets comprise the W standby pixel subsets;
    (M-W) subareas corresponding to (M-W) standby pixel subsets are adjacent to the W subareas; and
    the (M-W) standby pixel subsets are standby pixel subsets of the M standby pixel subsets other than the W standby pixel subsets.
6. The terminal device of claim 2, wherein the AP is configured to:
    control all pixels contained in M ordinary pixel subsets of the N ordinary pixel subsets to emit light; and
    control all pixels contained in M standby pixel subsets of the N standby pixel subsets to emit light, wherein the M ordinary pixel subsets are in one-to-one correspondence with the M standby pixel subsets and M is less than N and is a positive integer.
7. The terminal device of claim 6, wherein the fingerprint of the user is horizontally projected to M subareas corresponding to the M standby pixel subsets.
8. The terminal device of claim 6, wherein
    the fingerprint of the user is horizontally projected to W subareas corresponding to W standby pixel subsets, wherein W is less than M and is a positive integer;
    the M standby pixel subsets comprise the W standby pixel subsets;
    (M-W) subareas corresponding to (M-W) standby pixel subsets are adjacent to the W subareas; and
    the (M-W) standby pixel subsets are standby pixel subsets of the M standby pixel subsets other than the W standby pixel subsets.
9. The terminal device of claim 1, wherein all pixels contained in the standby pixel set are monochromatic pixels.
10. The terminal device of claim 1, wherein pixels contained in the standby pixel set are separated by pixels contained in the ordinary pixel set.
11. A method for fingerprint collection, applicable to a terminal device comprising an application processor (AP), an optical fingerprint sensor, and a touch display screen having a preset area, the preset area comprising an ordinary pixel set and a standby pixel set, the optical fingerprint sensor disposed under the preset area, the method comprising:
    controlling pixels contained in the ordinary pixel set and the standby pixel set in the preset area to emit light when a finger of a user is applied to the preset area, the light emitted by the pixels being configured to illuminate a fingerprint of the user, wherein pixels contained in the standby pixel set are used for fingerprint collection, and pixels contained in the ordinary pixel set are used for both fingerprint collection and display; and
    performing fingerprint collection on the fingerprint of the user illuminated by the light emitted by the pixels.

12. The method of claim 11, wherein the preset area comprises N subareas, and wherein the N subareas correspond to N ordinary pixel subsets and the ordinary pixel set comprises the N ordinary pixel subsets, the N subareas correspond to N standby pixel subsets and the standby pixel set comprises the N standby pixel subsets, and N is a positive integer.

13. The method of claim 12, wherein controlling the pixels contained in the ordinary pixel set and the standby pixel set in the preset area to emit the light comprises:
controlling all pixels contained in the N ordinary pixel subsets to emit light; and
controlling all pixels contained in M standby pixel subsets of the N standby pixel subsets to emit light, wherein M is less than N and is a positive integer.

14. The method of claim 13, wherein a projection of the fingerprint of the user in horizontal direction falls within M subareas corresponding to the M standby pixel subsets.

15. The method of claim 13, wherein
a projection of the fingerprint of the user in horizontal direction falls within W subareas corresponding to W standby pixel subsets, wherein W is less than M and is a positive integer;
the M standby pixel subsets comprise the W standby pixel subsets;
(M-W) subareas corresponding to (M-W) standby pixel subsets are adjacent to the W subareas; and
the (M-W) standby pixel subsets are standby pixel subsets of the M standby pixel subsets other than the W standby pixel subsets.

16. The method of claim 12, wherein controlling the pixels contained in the ordinary pixel set and the standby pixel set in the preset area to emit the light comprises:
controlling all pixels contained in M ordinary pixel subsets of the N ordinary pixel subsets to emit light; and
controlling all pixels contained in M standby pixel subsets of the N standby pixel subsets to emit light, wherein the M ordinary pixel subsets are in one-to-one correspondence with the M standby pixel subsets and M is less than N and is a positive integer.

17. The method of claim 16, wherein a projection of the fingerprint of the user in horizontal direction falls within M subareas corresponding to the M standby pixel subsets.

18. The method of claim 16, wherein
a projection of the fingerprint of the user in horizontal direction falls within W subareas corresponding to W standby pixel subsets, wherein W is less than M and is a positive integer;
the M standby pixel subsets comprise the W standby pixel subsets;
(M-W) subareas corresponding to (M-W) standby pixel subsets are adjacent to the W subareas; and
the (M-W) standby pixel subsets are standby pixel subsets of the M standby pixel subsets other than the W standby pixel subsets.

19. A non-transitory computer readable storage medium, storing a computer program which, when executed by a processor, causes the processor to carry out actions, comprising:
controlling pixels contained in an ordinary pixel set and a standby pixel set in a preset area to emit light when a finger of a user is applied to the preset area, the light emitted by the pixels being configured to illuminate a fingerprint of the user, wherein pixels contained in the standby pixel set are used for fingerprint collection, and pixels contained in the ordinary pixel set are used for both fingerprint collection and display; and
performing fingerprint collection on the fingerprint of the user illuminated by the light emitted by the pixels.

20. The non-transitory computer readable storage medium of claim 19, wherein the preset area comprises N subareas, and wherein the N subareas correspond to N ordinary pixel subsets and the ordinary pixel set comprises the N ordinary pixel subsets, the N subareas correspond to N standby pixel subsets and the standby pixel set comprises the N standby pixel subsets, and N is a positive integer.

* * * * *